United States Patent [19]

Foster

[11] Patent Number: 4,500,304

[45] Date of Patent: Feb. 19, 1985

[54] BELT TENSIONER

[75] Inventor: Randy C. Foster, Springfield, Mo.

[73] Assignee: Dayco Corporation, Dayton, Ohio

[21] Appl. No.: 468,918

[22] Filed: Feb. 23, 1983

Related U.S. Application Data

[62] Division of Ser. No. 301,351, Sep. 11, 1981, Pat. No. 4,413,982.

[51] Int. Cl.³ .............................................. F16H 7/12
[52] U.S. Cl. .................................... 474/138; 474/110
[58] Field of Search ............................... 474/133–138; 267/8 R, 34, 82, 90, 140.1, 140.4

[56]   References Cited

U.S. PATENT DOCUMENTS

| 1,077,339 | 11/1913 | Farrell | 474/138 |
| 2,554,738 | 5/1951 | Hager et al. | 474/138 |
| 3,802,286 | 4/1974 | Winklhofer et al. | 474/111 |
| 4,425,103 | 1/1984 | Foster | 474/138 |

FOREIGN PATENT DOCUMENTS

| 675793 | 5/1939 | Fed. Rep. of Germany | 267/34 |
| 1112363 | 8/1961 | Fed. Rep. of Germany | 474/138 |
| 455662 | 1/1949 | Italy | 474/136 |
| 56-90143 | 7/1981 | Japan | 267/140.1 |
| 224415 | 6/1943 | Switzerland | 474/137 |
| 279415 | 3/1952 | Switzerland | 474/135 |
| 739290 | 6/1980 | U.S.S.R. | 474/138 |

Primary Examiner—Lawrence J. Staab
Attorney, Agent, or Firm—Joseph V. Tassone

[57]   ABSTRACT

A tensioner for a power transmission belt that is adapted to be operated in an endless path is provided and comprises a support unit for being fixed relative to the belt, a belt engaging unit carried by the support unit and being movable relative thereto, a mechanical spring unit operatively associated with the support unit and the belt engaging unit for urging the belt engaging unit relative to the support unit and against the belt with a force to tension the belt, and a fluid dampening unit operatively associated with the support unit and the belt engaging unit to dampen the movement of the belt engaging unit relative to the support unit in at least one direction of the movement thereof, the fluid dampening unit comprising a piston and cylinder unit. The mechanical spring unit comprises a pair of coiled compression springs with their longitudinal axes disposed in substantially parallel side-by-side spaced relation, the fluid dampening unit being generally disposed between the springs and in substantially parallel relation therewith.

4 Claims, 12 Drawing Figures

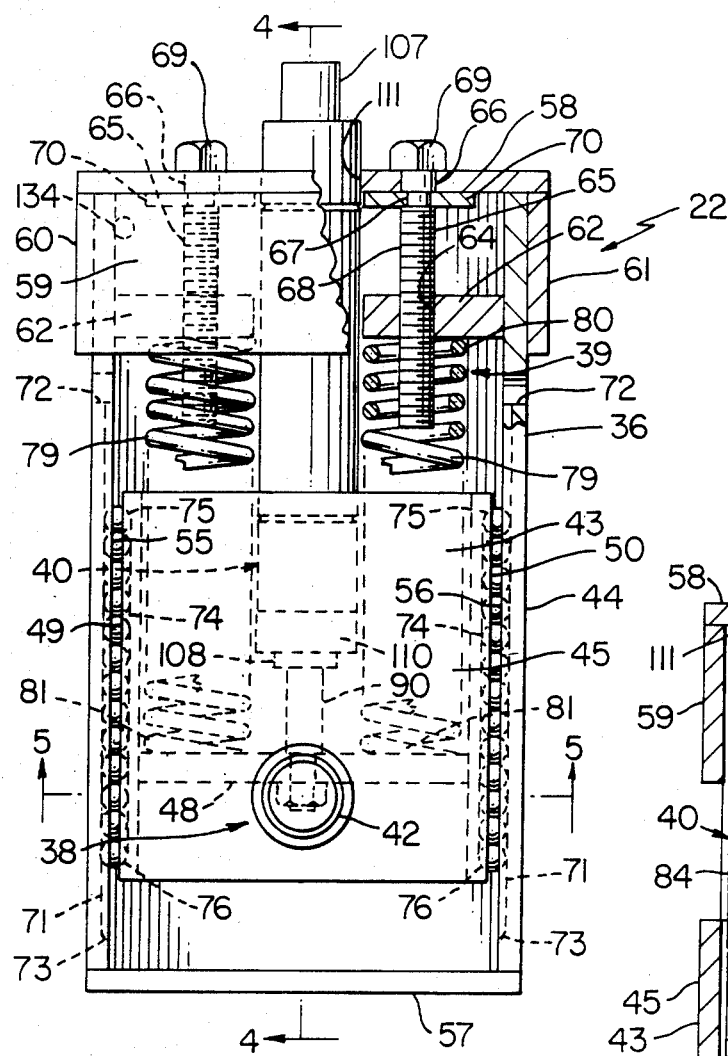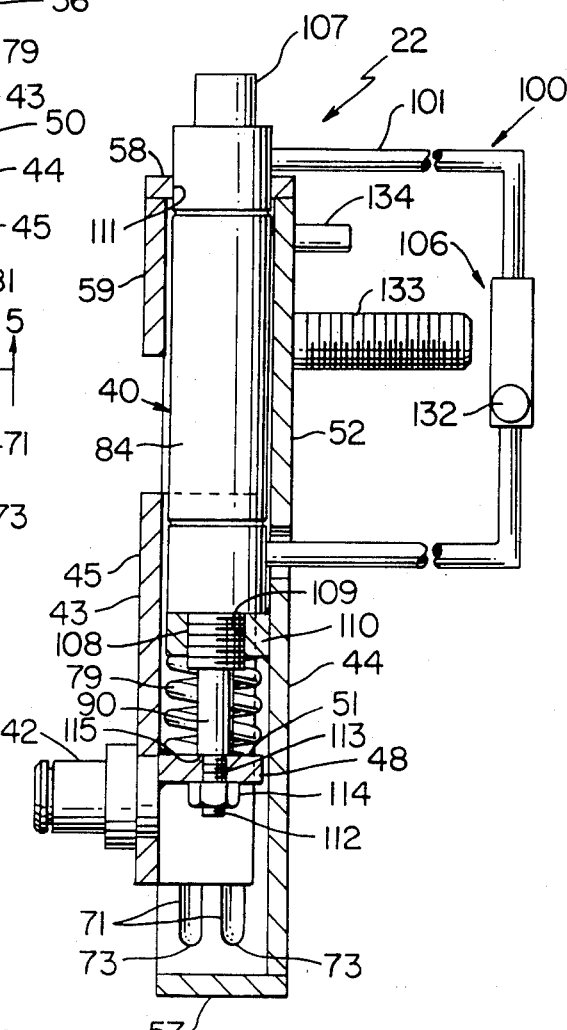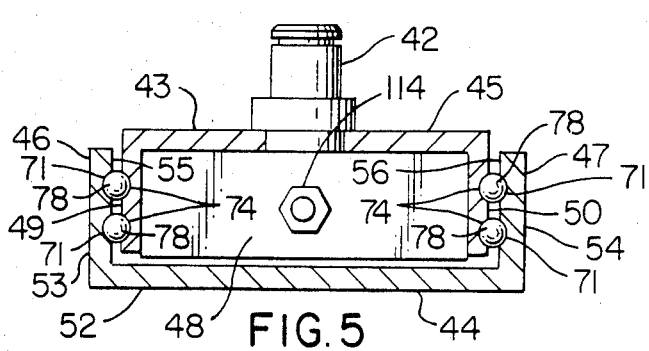

BELT TENSIONER

CROSS REFERENCE TO RELATED APPLICATION

This application is a divisional patent application of its copending parent patent application, Ser. No. 301,351, filed Sept. 11, 1981, now U.S. Pat. No. 4,413,982.

BACKGROUND OF THE INVENTION

B 1. Field of the Invention

This invention relates to an improved tensioner for an endless power transmission belt or the like, an improved part for such a tensioner or the like and to methods of making such a tensioner and/or part therefor.

2. Prior Art Statement

It is known to applicant to provide a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and a fluid dampening means operatively associated with the support means and the belt engaging means to dampen the movement of the belt engaging means relative to the support means in at least one direction of movement thereof, the fluid dampening means comprising a piston and cylinder means;

For example, see the copending patent application Ser. No. 296,694, filed Aug. 27, 1981, of Leslie B. Wilson, wherein the fluid dampening means comprises a cylinder means having a piston means therein and defining two chambers for fluid in the cylinder means on opposite sides of the piston means together with preferential flow control means interconnecting the two chambers together.

Also see the copending patent application Ser. No. 296,697, filed Aug. 27, 1981, of Randy C. Foster et al wherein another such tensioner is provided and the fluid dampening means thereof comprises a cylinder means having a piston means therein and defining two chambers for fluid in the cylinder means on opposite sides of the piston means with the spring means being disposed in one of those chambers.

Also see the U.S. Pat. No. 3,802,286 of Gerhard Winklhofer et al wherein a piston of a piston and cylinder means of a tensioner is urged in a tensioning direction by a compression spring disposed within the cylinder and bearing against the piston member, the piston member being cup-shaped and the cylinder member being cup-shaped with the piston member telescoped therein and with the cavity therebetween being filled with a hydraulic fluid for movement dampening purposes.

It is also known to provide a belt tensioner with a friction surface dampening means of the solid type utilized to tend to dampen vibrations and the like that are imposed on the belt tensioner.

It is also known to provide fluid couplings, such as torque converters, wherein rotational movement of one member causes rotational movement of another member because a fluid translates such movement between the two members, each member having vanes thereon.

SUMMARY OF THE INVENTION

It is one feature of this invention to provide an improved tensioner for a power transmission belt or the like.

In particular, it was found according to the teachings of this invention that a relatively small and compact belt tensioner could be provided by uniquely arranging the mechanical spring means thereof and the fluid dampening means thereof in a manner believed to be more compact than the arrangements set forth in the aforementioned copending patent applications, Ser. No. 296,694, filed Aug. 27, 1981, of Leslie B. Wilson and Ser. No. 296,697, filed Aug. 27, 1981, of Randy C. Foster et al, both of these copending patent applications being hereby incorporated into this disclosure by this reference thereto.

In particular, it was found according to the teachings of this invention that the spring means of a belt tensioner can comprise a pair of springs disposed in substantially parallel spaced relation with the fluid dampening means having at least a part thereof disposed between the springs in substantially parallel relation therewith to render the belt tensioner substantially small and compact.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and a fluid dampening means operatively associated with the support means and the belt engaging means to dampen the movement of the belt engaging means relative to the support means in at least one direction of movement thereof the fluid dampening means comprising a piston and cylinder means and, the mechanical spring means comprising a pair of coiled compression springs with their longitudinal axes disposed in substantially parallel side-by-side spaced relation with the fluid dampening means side-by-side being generally disposed between the springs and in substantially parallel relation therewith. The belt engaging means has a part thereof disposed in sliding relation with the support means, the part of the belt engaging means having a pair of substantially flat parallel spaced apart surfaces interconnected together by a front wall. The support means has a pair of substantially flat parallel spaced apart surfaces respectively facing the surfaces of the part of the belt engaging means and being interconnected together by a rear wall. Bearing means are disposed between the facing surfaces to facilitate the sliding movement between the part of the belt engaging means and the support means. The part of the belt engaging means has a third substantially flat surface disposed between the pair of surfaces thereof and being substantially transverse relative thereto, the springs and the piston member of the fluid dampening means being respectively operatively interconnected to the third surface of the belt engaging means. The part of the support means has a third substantially flat surface disposed between said pair of surfaces thereof and being substantially transverse thereto and being between the pair of springs. The cylinder member of the fluid dampening means being operatively interconnected to the third surface of the support means.

Accordingly, it is an object of this invention to provide an improved tensioner for a power transmission belt or the like that is adapted to be operated in an endless path, the tensioner of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 3 is an enlarged front view, partially broken away and partially in cross section, of the belt tensioner of this invention that is being utilized for tensioning the power transmission belt of FIGS. 1 and 2.

FIG. 4 is a cross-sectional view taken on lines 4—4 of FIG. 3.

FIG. 5 is a cross-sectional view taken on lines 5—5 of FIG. 3.

DESCRIPTION OF THE PREFERRED EMBODIMENTS

Figure 1:
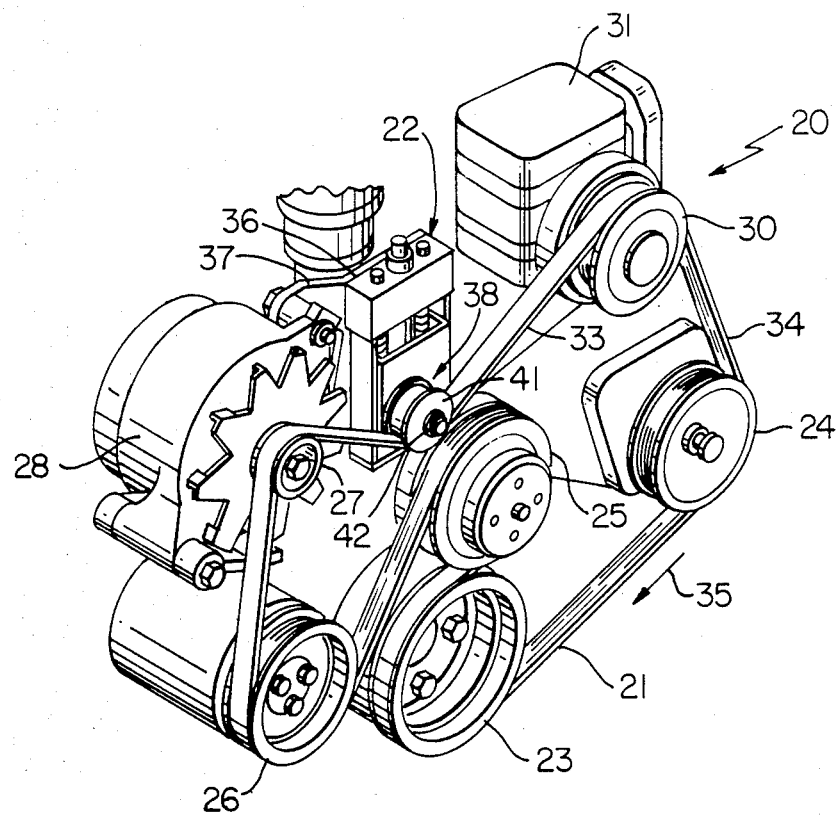
FIG. 1 is a fragmentary isometric view looking toward the front end of an automobile engine which utilizes one embodiment of the belt tensioner of this invention.

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangments as desired.

Also, while the improved rotary dampening means of this invention is described and illustrated as providing part of a belt tensioner, it is to be understood that the improved rotary dampening means of this invention can be utilized for other purposes as desired.

Therefore, this invention is not to be limited to only the embodiments illustrated in the drawings, because the drawings are merely utilized to illustrate one of the wide variety of uses of this invention.

Figure 2:
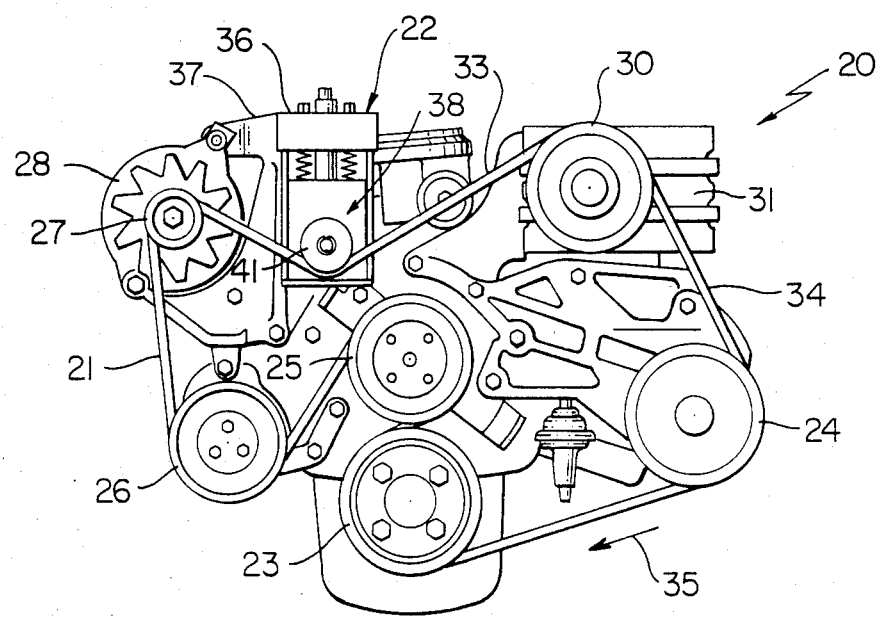
FIG. 2 is a view looking perpendicularly toward th front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because the unique features of the tensioner 22 of this invention readily permits the tensioner 21 to tension a belt having a polyester load-carrying cord in an efficient manner as hereinafter described.

The belt 21 is driven by a driving sheave 23 which is operatively interconnected to the crankshaft of the enging 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the compressor 31. This cylic change and load varies between greater extremes in applications where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produce variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31 whereby the improved belt tensioner 22 of this invention will now be described.

Figure 6:
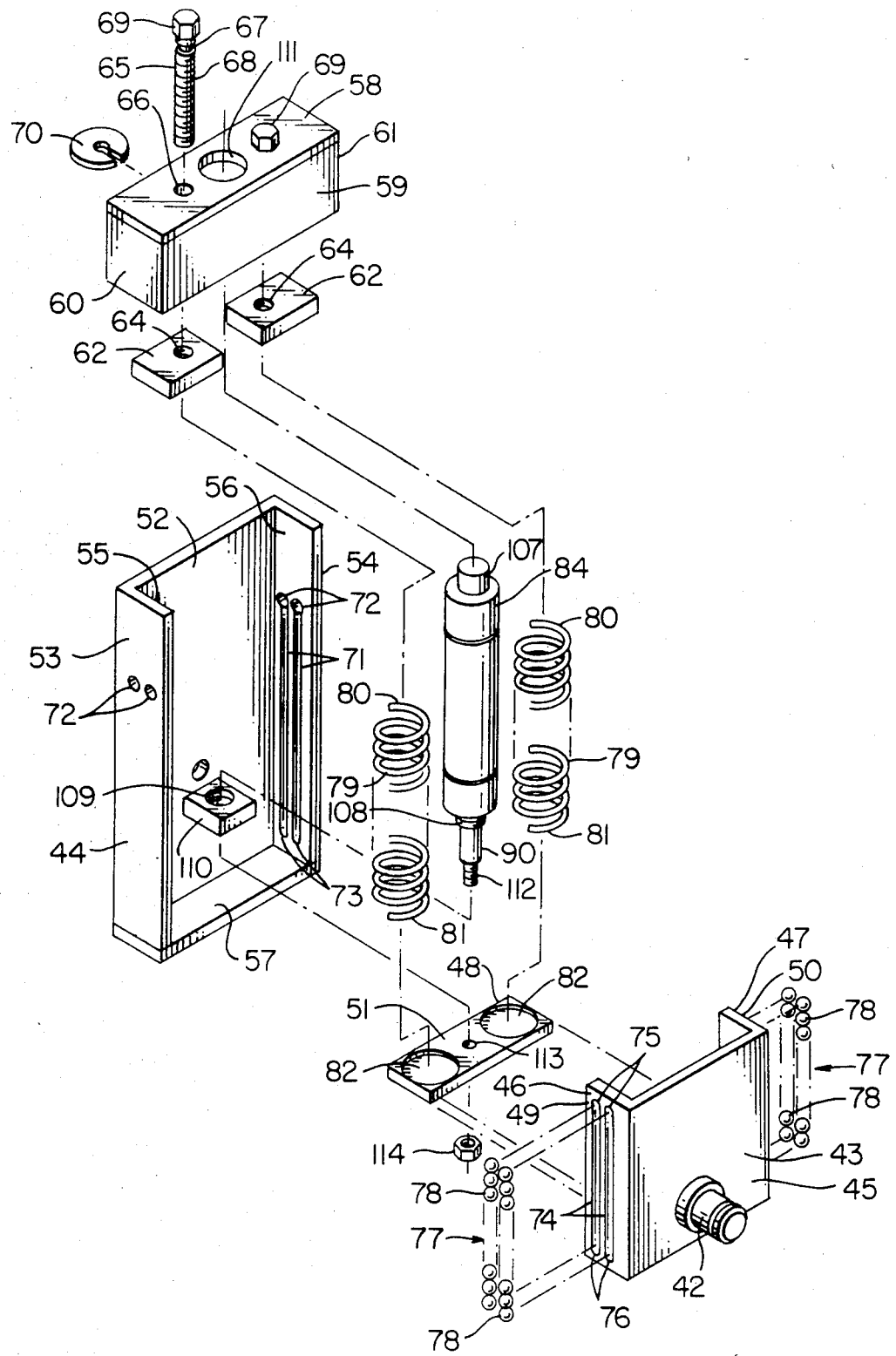
FIG. 6 is an exploded perspective view of the various parts forming the belt tensioner of FIGS. 3-5.

As best illustrated in FIGS. 3 and 6, the improved belt tensioner 22 of this invention comprises a support means 36 adapted to be fixed to a mounting bracket 37 of the engine 20 as illustrated in FIGS. 1 and 2. A belt engaging means that is generally indicated by the reference numeral 38 is movably carried by the support means 36 in a manner hereinafter set forth. The tensioner 22 has mechanical spring means that is generally indicated by the reference numeral 39 operatively associated with the support means 36 and belt engaging means 38 to tend to urge the belt engaging means 38 against the slack side 33 of the belt 21 in substantially a true vertically downwardly direction in a manner to substantially bisect the angle made by the belt 21 between the sheaves 27 and 30 as illustrated in FIG. 2.

The belt tensioner 22 also includes a fluid dampening means that is generally indicated by the reference numeral 40 and is operatively associated with the support means 36 and the belt engaging means 38 to dampen movement of the belt engaging means 38 relative to the support means 36 in a manner hereinafter set forth.

The belt engaging means 38 comprises an idler pulley 41 rotatably mounted on an axle 42 carried by a slide member 43 disposed for sliding in a box-like member 44 of the support means 36 in a manner hereinafter set forth, the slide member 43 having a substantially rectangular front wall 45 and a pair of rearwardly extending substantially parallel rectangular and integral side walls 46 and 47 being bridged by a transverse wall 48 secured thereto in any suitable manner, such as by welding on the like. In this manner, the rearwardly extending side walls 46 and 47 define a pair of outwardly facing substantially parallel surfaces 49 and 50 while the transverse wall 48 defines a surface 51 that is disposed between and transverse to the side surfaces 48 and 50 for a purpose hereinafter described.

The box-like member 44 of the support means 36 has a substantially rectangular rear wall 52 with a pair of forwardly extending parallel and integral side walls 53 and 54 which respectively define inwardly facing substantially parallel surfaces 55 and 56 for respectively facing the side surfaces 49 and 50 of the slide member 43 of the belt engaging means 38 for a purpose that will be apparent hereinafter.

A substantially rectangular bottom wall 57 is secured to the rear wall 52 and side walls 53 and 54 of the support member 44 in any suitable manner, such as by welding or the like, and a substantially rectangular top wall 58 is likewise secured to the rear wall 52 and side walls 53 in any suitable manner, such as by welding or the like. In addition a partial substantially rectangular front wall 59 and partial side walls 60 and 61 are carried by the top wall 58 and extend across and overlap the side walls 53 and 54 in a cap-like manner as illustrated in FIGS. 3 and 4 to provide a means for capturing and guiding up and down movement of a pair of substantially rectangular spring retainers 62 which respectively have threaded openings 64 passing therethrough and respectively threadedly receiving threaded adjusting members 65 that are rotatably carried in openings 66 in the top wall 58.

In particular, each threaded adjusting member 65 has a reduced non-threaded section 67 intermediate the threaded portion 68 thereof and an enlarged head 69 thereof that is telescopically received in an opening 66 of the top wall 58 and is held therein by a C-shaped clip 70 in a manner well known in the art so that rotation of the particular threaded fastening member 65, such as by turning the head 69 thereof with a suitable tool or the like, will cause rotation of the adjusting member 65 and, thus, a threading relation of its respective spring retainer 62 upwardly or downwardly on the threaded fastening member 65 within the top cap portion of the box-like support member 44 for a purpose hereinafter described.

The facing side surfaces 55 and 56 of the box-like support member 44 respectively are provided with a pair of parallel grooves 71 that respectively extend from openings 72 formed through the respective side wall 53 or 54 to the ends 73 thereof.

In a similar manner the outwardly facing side surfaces 49 and 50 of the slide member 43 of the belt engaging means 38 each has a pair of parallel grooves 74 formed therein with each groove 74 terminating at the opposed ends 75 and 76 thereof.

The grooves 74 of the slide member 43 cooperate with the grooves 71 of the support member 44 to carry bearing means that are generally indicated by the reference numeral 77 and that facilitate sliding movement of the slide member 43 relative to the support member 44.

In particular, the bearing means 77 comprise a plurality of ball bearings 78 that substantially fill the grooves 74 of the slide member 43 and partially fill the grooves 77 of the support member 44 to permit up and down sliding movement of the slide member 43 within the box-like member 44 as illustrated in FIGS. 3 and 4.

In order to initially dispose the ball bearings 78 in the cooperating grooves 71, 74, the slide member 43 is positioned in the member 44 so that the upper ends 74 of the grooves 74 are slightly above the openings 72 in the side walls 53 and 54 of the member 44 so that the ball bearings 78 can be fed through the openings 72 into the cooperating grooves 71 and 74. Once the grooves 74 have been filled with the ball bearings 78, the slide member 43 is moved downwardly so that the ends 75 of the grooves 74 are below the openings 72 whereby the ball bearings 78 cannot escape from the cooperating grooves 71, 74, the openings 72 being so positioned that the normal range of up and down movement of the slide member 43 relative to the box-like member 44 during its belt tensioning function of the tensioner 22 in a manner hereinafter set forth will not cause the upper ends 75 of the grooves 74 of the slide member 43 to reach the openings 72 whereby the ball bearings 78 are fully captured in the cooperating grooves 71 and 74 for their substantially frictionless bearing purpose.

The mechanical spring means 39 of the tensioner 22 of this invention comprises a pair of coiled compression springs 79 with their longitudinal axes disposed in spaced-apart parallel side-by-side spaced relation in the box-like support member 44 and respectively have upper ends 80 bearing against the adjustable spring retainers 62 while having the lower ends 81 thereof respectively being received in substantially cylindrical recesses 82 formed in the surface 51 of the transverse wall 48 of the slide member 43.

In this manner, the force of the compression springs 79 tends to urge the slide member 43 downwardly relative to the support member 44, the force of the compression springs 79 being adapted to be adjusted by the adjustable spring retainer 62 being axially threaded upwardly and downwardly on the respective threaded adjusting members 65 in the manner previously set forth.

Figure 7:
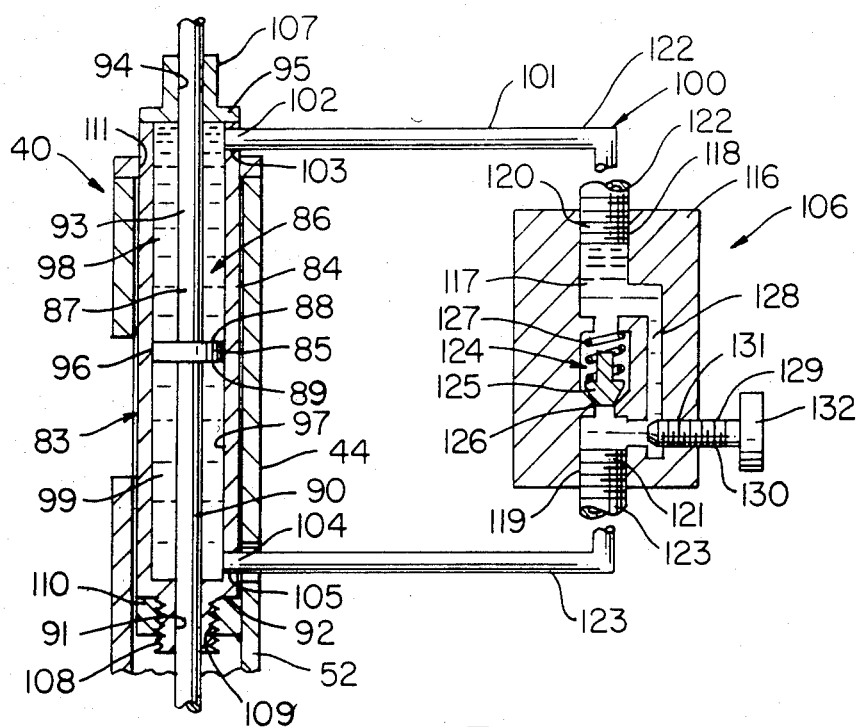
FIG. 7 is a schematic view in cross section and illustrates the fluid flow control means of the fluid dampening means of the belt tensioner of FIGS. 3-6.

The fluid dampening means 40 comprises a piston and cylinder means that is generally indicated by the reference numeral 83 and comprises a cylinder member 84 and a piston member 85, FIG. 7, disposed for movement within a substantially cylindrical chamber 86 formed in the cylinder member 84, the piston member 85 having a piston rod 87 secured thereto and extending from opposed sides 88 and 89 thereof so that a lower part 90 of the piston rod 87 extends out of an opening 91 in a lower end wall 92 of the cylinder member 84 and an upper part 93 of the piston rod 87 extends out of an opening 94 in an upper end wall 95 of the cylinder member 84.

The piston member 85 of the fluid dampening means 40 has an external peripheral surface 96 disposed in sliding and sealing engagement with the internal peripheral surface 97 of the cylinder member 84 that defines the chamber 86 thereof whereby the piston member 85 divides the chamber 86 into an upper chamber section 98 and a lower chamber section 99 substantially sealed from each other by the piston member 85. However, the chamber sections 98 and 99 are fluidly interconnected together by a passage defining means that is generally indicated by the reference numeral 100 and comprises a conduit means 101 having one end 102 thereof secured in an opening 103 formed through the cylinder member 84 adjacent the end wall 95 thereof while the other end 104 of the conduit means 101 is secured in an opening 105 formed through the cylinder member 84 adjacent the end wall 92, the conduit means 101 having a flow control valve means therein that is generally indicated by the reference numeral 106 and that is utilized for controlling fluid flow through the conduit means 101 in a manner hereinafter described.

The cylinder member 84 has a pair of opposed reduced ends 107 and 108 through which the piston rod parts 93 and 90 respectively extend, the reduced end 108 being externally threaded to be threadedly received in an internally threaded bore 109 of a substantially rectangular block 110 secured to the rear wall 52 of the support member 44 in any suitable manner, such as welding or the like, whereby the lower end 108 of the cylinder member 84 is secured to the support member 44 so as to be non-movable relative thereto. The upper end 107 of the cylinder member 84 projects out of an opening 111 formed in the top wall 58 of the box-like support member 44.

The piston member 85, in turn, is operatively interconnected to the slide member 43 because the lower piston rod part 90 thereof has a reduced externally threaded section 112 received through an opening 113 formed through the transverse wall 48 of the slide member 43 and carries a nut 114 thereon to sandwich the transverse wall 48 between the nut 114 and an annular shoulder 115 on the piston rod section 90 whereby the piston member 85 will move in unison with the slide member 43 relative to the support member 44 in a manner hereinafter set forth.

Thus, it can be seen that the piston and cylinder means 83 is disposed substantially parallel to the springs 79 and between the same, the springs 79 and piston member 85 being operatively interconnected to the slide member 43 and the springs 79 and cylinder member 84 being operatively interconnected to the support means 36 and thereby permit the tensioner 22 to be substantially small and compact to operate in a manner hereinafter set forth.

The flow control valve means 106 illustrated in FIG. 7 comprises a housing means 116 having a first passage 117 passing therethrough and defining opposed openings 118 and 119 in the housing means 116 that respectively receive ends 120 and 121 of conduit sections 122 and 123 of the conduit means 101 as illustrated, the conduit ends 120 and 121 being secured in the openings 118 and 119 in any suitable manner, such as by the threaded relation illustrated.

A one-way check valve means that is generally indicated by the reference numeral 124 in FIG. 7 is disposed in the first passage means 117 to permit fluid flow from the conduit section 123 to the conduit section 122 and, thus, from the chamber section 99 to the chamber section 98 of the fluid dampening means 40 while preventing reverse flow from the conduit section 122 to the conduit section 123 through the first passage 117 and, thus, from the chamber section 99 of the fluid dampening means 40.

In particular, the one-way check valve means 124 comprises a movable valve member 125 normally urged against a valve seat 126 in the passage means 117 by a compression spring 127 so that fluid pressure from the conduit section 123 will open the valve member 125 against the force of the compression spring 127 to provide full and unrestricted flow of fluid from the conduit section 123 to the conduit section 122 through the passage means 117. However, when fluid flow is from the conduit section 122 toward the conduit section 123 through the passage means 117, the compression spring 127 closed the valve member 125 against the valve seat 126 to prevent such fluid flow.

However, a second passage 128 is formed in the housing means 116 and is interconnected to the passage 117 on opposite sides of the one-way check valve means 124 thereof so as to be in fluid communication with the conduit sections 122 and 123. The passage 128 is adapted to have the flow of fluid thereto controlled by an adjusting member 129 in a manner well known in the art, the adjusting member 129 having a threaded section 130 disposed in a threaded bore 131 in the housing means 116 so that an operator can rotate the adjusting member 129 by grasping a knob end 132 thereof so as to position the adjusting member 129 in a desired flow restricting position thereof to limit the rate of fluid flow through the passage 128 and, thus, the rate of fluid flow from the conduit section 122 to the conduit section 123 through the passage 128 as the one-way valve means 124 is preventing fluid flow at that time through the passage 117 for a purpose hereinafter described.

As previously stated, the piston rod section 90 is interconnected to the belt engaging means 38 while the cylinder member 84 is interconnected to the stationary support means 36 so as the belt engaging means 38 moves downwardly in the drawings in a direction to tension the belt 21, such downward movement of the piston rod 87 and piston member 85 therewith tends to decrease the volume of the chamber section 99 while increasing the volume of the chamber section 98 a like amount. However, the fluid being displaced from the chamber section 99 by the downwardly moving piston 85 must be transferred to the chamber section 98 through the conduit means 101 and, thus, through the flow control valve means 106. Because the fluid flow through the passage 117 of the flow control means 106 is from the conduit section 123 to the conduit section 122, the one-way check valve means 124 is opened and permits such fluid flow therethrough in substantially an unrestricted manner.

Conversely, when the piston rod 87 is moved upwardly by the belt engaging means 38 being moved upwardly by the tensioned belt 21 in a manner hereinafter set forth, such upward movement of the piston rod 87 is retarded or restricted by amount determined by the setting of the adjusting member 129 of the flow control means 106.

In particular, as the piston member 85 moves upwardly in FIG. 7, the same tends to displace fluid from the chamber section 98 to the chamber section 99 through the passage defining means 100 and thus the fluid flow through the flow control valve means 106 is from the conduit section 122 to the conduit section 123 whereby the one-way check valve means 24 closes the passage 117 so that the entire fluid flow has to pass through the restricted passage 128 of the flow control valve 106 and thereby restricts the upward movement of the belt engaging means 38 relative to the belt 21 for a purpose hereinafter described.

While the flow control valve means 106 has been previously illustrated and described as merely restricting fluid flow in one direction thereof in an adjustable manner, it is to be understood that the flow control valve means 106 can be a fixed flow control valve means, be an adjustable flow control valve means in both directions of flow therethrough and even be adapted to close the passage defining means 100 to substantially lock the idler pulley 41 in a set position relative to the support means 36 as will be apparent hereinafter.

Also, while it is presently preferred that the fluid that fills the chamber sections 98, 99 and the passage defining means 100 comprise a liquid, such as a hydraulic oil or the like, it is to be understood that any suitable fluid, such as air or other gas or gases, can be utilized and will function substantially in the same manner. Therefore, the dampening means 40 is referred to as a fluid dampening means.

In order to mount the tensioner 27 of this invention to the bracket 37 of the engine 20, the rear wall 52 of the support member 44 has an externally threaded fastening member 133 secured thereto and adapted to be received in an opening (not shown) in the bracket 37 and be secured thereto by a nut (not shown) threaded on the threaded fastening member 133 in a manner well known in the art. In order to prevent rotation of the tensioner 22 relative to the support bracket 37, one or more rigid pins 134 can be secured to the rear wall 52 of the support member 44 and be received in suitable openings (not shown) in the bracket 37 at the same time the fastening member 33 is being received in its opening. However, it is to be understood that other mounting means can be utilized to secure the tensioner 22 to the bracket 37 as desired.

Therefore, it can be seen that it is a relatively simple method of this invention to make the improved belt tensioner 22 of this invention that is adapted to operate in a manner now to be described.

When the tensioner 22 of this invention has been mounted by its support member 44 to the bracket 37 of the engine 20 in the manner previously described so that the idler pulley 41 thereof is engaging against the belt 21 under the urging force of the springs 79, the installer can adjust the adjusting members 65 upwardly or downwardly relative to the top plate 58 so that the springs 79 will be under a certain initial compression and thereby be providing a predetermined force against the belt 21 in the at rest position of the engine 20. In addition, the flow control valve 106 has been either factory adjusted or installer adjusted to set the desired differential flow characteristics between the chambers 98 and 99 of the dampening means 40.

Thereafter, each time the engine 20 is initially started so as to cause slack in the slack side 33 thereof and provide a tensioning force thereon as determined by the force of the springs 79, such inward movement of the pulley 41 causes the piston member 85 to move downwardly in FIG. 7 and displace fluid in the chamber 99 through the passage defining means 100 and the flow control valve means 106 to the chamber 98 in a manner to dampen such downward movement of the pulley 41.

Thus, it can be seen that as the belt 21 is traveling in the direction of the arrow 35 in FIGS. 1 and 2 by the running engine 20, any vibrations and oscillations of the belt 21, such as caused by the turning on and off of the air conditioning compressor 31 as previously set forth, will cause an up and down oscillation of the portion 33 of the belt 21 which movement is imposed on the pulley 41 of the tensioner 22.

In those instances where the deflection of the portion 33 of the belt 21 is upwardly in FIGS. 1 and 2 to tend to cause the pulley 41 to move upwardly relative to the support means 36, such movement causes the piston member 85 to move upwardly and thereby force the fluid from the chamber 98 through the passage defining means 100 and flow control valve 106 to the chamber 99 and since the flow control valve 106 is set to restrict such flow at a greater rate than in the reverse direction of fluid flow through the passage defining means 100, such upward movement of the pulley 41 relative to the support means 36 is at a slower rate than when the pulley 41 is being moved downwardly away from the support means 36, the flow control means 106 being such that even the downward movement of the pulley 41 away from the support means 36 is dampened to a certain degree.

In this manner, it is believed that the dampening means 40 of this invention will prolong the life of the tensioner 22 so that rapid oscillations of the springs 79 thereof cannot take place and the springs 79 will perform their tensioning function in a relatively smooth manner.

In particular, since the flow control means 106 provides a preferential flow ratio that can be controlled, the tensioner 22 will deliver increased tension on the belt 21 when the belt 21 is subjected to acceleration and/or heavy cyclic loads commonly encountered in belt drive systems. Accordingly, if the fluid flow from chamber 98 to chamber 99 is more restrictive than reverse flow, load fluctuations in the belt system will result in an increased pressure on the top side 88 of the piston 85 which will force the idler pulley 41 down into the belt 21 and result in greater belt tension. In this manner, the tensioner 22 will deliver greater tension when the system demands and less tension when less tension is required. This can result in increased bearing life in belt driven accessories, reduced belt slippage under heavy loading conditions, and an increased effective life of the tensioner 22 itself.

While one form of fluid dampening means 40 for the tensioner 22 of this invention has been illustrated and described, it is to be understood that other fluid dampening means can be utilized for the tensioner 22 of this invention, as desired.

Figure 8:
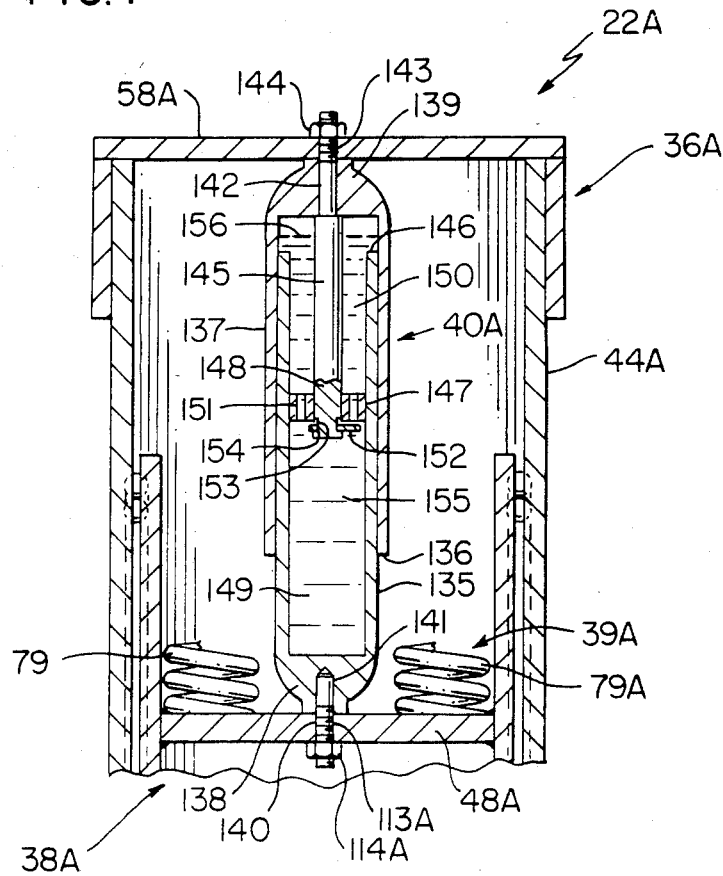
FIG. 8 is a view similar to FIG. 3 and illustrates another embodiment of the belt tensioner of this invention.

For example, another belt tensioner of this invention is generally indicated by the reference numeral 22A in FIG. 8 and parts thereof similar to the tensioner 22 previously described are indicated by like reference numerals followed by the reference letter "A."

As illustrated in FIG. 8, the tensioner 22A is substantially identical to the tensioner 22 previously described except that the fluid dampening means 40A thereof comprises a substantially conventional shock absorber structure having a first tubular member 135 telescoped in sliding and sealing relation within an open end 136 of another tubular member 137, a closed end 138 of the tubular member 135 being secured to the plate 48A of the belt engaging means 38A while a closed end 139 of the tubular member 137 is secured to the top plate 58A of the support member 44A so as to be interconnected to the support means 36A.

In particular, the closed end 138 of the tubular member 135 is secured to the plate 48A by a fastening means 140 being disposed in the opening 113A of the plate 48A and being held thereto by the nut 114A, the fastening means 140 being secured in an opening 141 in the closed end 138 of the tubular member 135 in any suitable manner.

The closed end 139 of the tubular member 137 has a fastening means 142 carried thereby and being received in an opening 143 passing through the top wall 58A of the support means 44A and being secured thereto by a suitable nut 144.

The fastening means 142 also includes a piston-like rod 145 being suspended within an open end 146 of the tubular member 135 and carrying a piston means 147 on the lower end 148 thereof so that the piston means 147 is held stationary by the support means 44A while the tubular member 135 is adapted to slide relative to the piston means 147.

The piston means 147 divdies the tubular member 135 into two chamber sections 149 and 150, the piston member 147 having a plurality of openings 151 passing therethrough to fluidly interconnect the chambers 149 and 150 together.

However, a movable valve member 152 is carried on a reduced sleeve portion 153 of the end 148 of the rod 145 so that the valve member 152 can be disposed against a lower shoulder 154 of the rod 148 and thereby be disposed away from some of the passage 151 of the piston member 147 while being adapted to move upwardly on the sleeve portion 153 to engage against the piston member 147 and close off one or more of the passages 151 in a manner and for a purpose hereinafter described.

A suitable hydraulic fluid, such as a hydraulic oil 155, is disposed in the chambers 149 and 150 and in the embodiment illustrated in FIG. 8, the chamber 150 is only filled to a level 156 in order to compensate for the amount of volume being taken up by the open end 146 of the tubular member 135 telescoping upwardly into the tubular member 137 as will be apparent hereinafter.

Therefore, it can be seen that it is a relatively simple method of this invention to make the tensioner 22A in the manner previously described in connection with the tensioner 22 and merely substitute the shock absorber means 40A for the fluid dampening means 40 thereof to operate in a manner now to be described.

After the support means 36A has been mounted to the engine bracket 37 in the manner previously described and the initial compression force of the compression springs 39A have been set in the manner previously described for the tensioner 22, any downward movement of the belt engaging means 38A under the force of the compression springs 79A causes the tubular member 135 to move downwardly relative to the tubular member 137 and thereby increase the volume of the chamber 149 so that a resulting vacuum condition in the chamber 149 immediately draws fluid from the chamber 150 through the openings 151. The openings 151 are so sized that the same provide a desired dampening to such downward movement of the belt engaging means 38A. Of course, the openings 151 can be so designed that there will be no restriction of such downward movement of the belt engaging means 38A under the force of the compression springs 79A if desired.

Conversely, when the engaged belt tends to move the belt engaging means 38A upwardly in FIG. 8, such upward movement of the tubular member 135 relative to the tubular member 137 tends to cause a decrease in the volume of the chamber 149 so that the fluid 155 therein is forced through the openings 151 into the chamber 150. However, such upward flow of the fluid 155 relative to the stationary piston 147 causes the valve member 152 to move upwardly and close off one or more of the passages 151 so that the fluid flow through the piston member 147 from the chamber 149 to the chamber 150 is restricted to thereby restrict upward movement of the belt engaging means 38A at a rate greater than when the belt engaging means 38A is moved downwardly for the reasons previously set forth in connection with the tensioner 22.

Therefore, it can be seen that the shock absorber means 40A is disposed in a parallel relation between the parallel springs 79A to render the tensioner 22A relatively small and compact in the same manner that the piston and cylinder means 84, 85 is disposed in a parallel relation to the springs 79 to render the tensioner 22 relatively small and compact, the shock absorber means 40A and piston and cylinder means 84, 85 each functioning to fluid dampen movement of the respective belt engaging means 38A and 38 relative to the respective support means 36A and 36.

Another belt tensioner of this invention is generally indicated by the reference numeral 22B in FIGS. 9–12 and parts thereof similar to the tensioners 22 and 22A previously described are indicated by like reference numerals followed by the reference letter "B".

Figure 9:
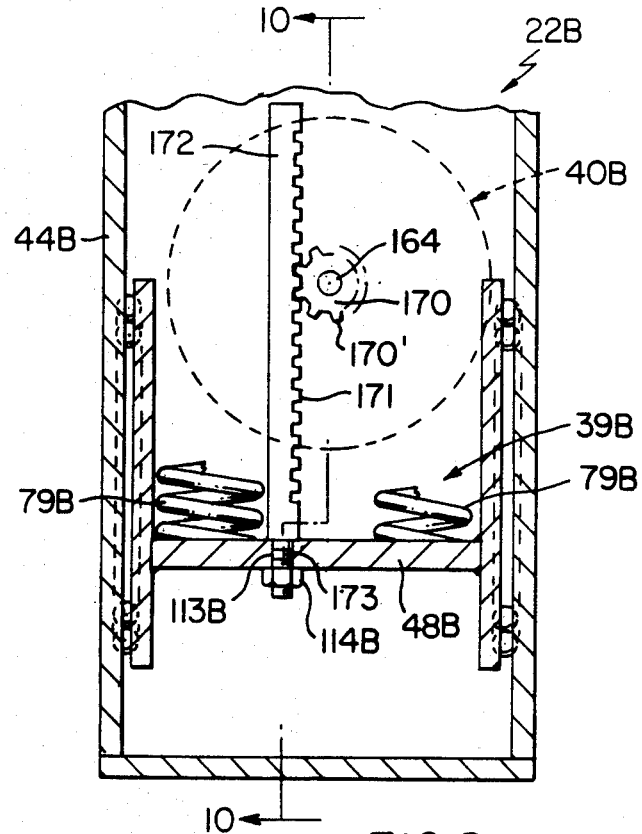
FIG. 9 is a view similar to FIG. 8 and illustrates another embodiment of the belt tensioner of this invention.
Figure 10:
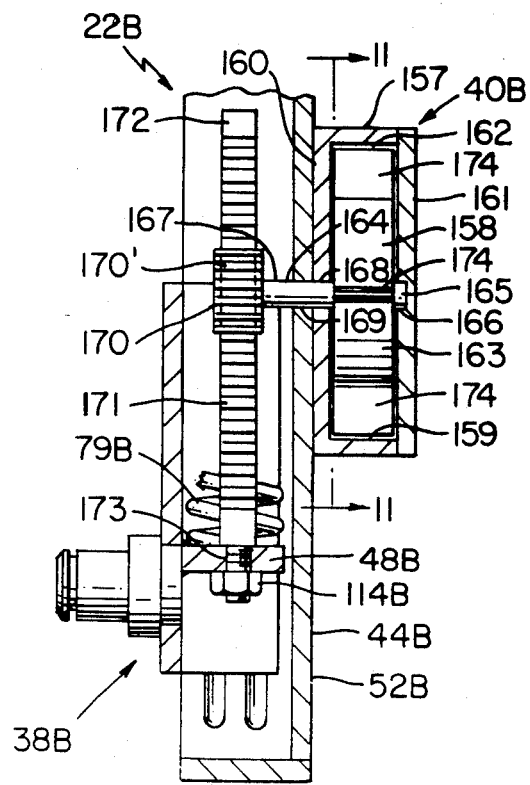
FIG. 10 is a side view of the belt tensioner of FIG. 9 and is taken in the direction of the arrows 10—10 thereof.

As illustrated in FIGS. 9 and 10, the tensioner 22B is essentially the same as the tensioner 22 previously described except that the same utilizes another fluid dampening means of this invention that is generally indicated by the reference numeral 40B and comprises an outer ring-like member 157 and an inner ring-like member 158 disposed in the outer ring member 157 with the ring members 157 and 158 being arranged for relative rotational movement therebetween whereby the fluid dampening means 40B comprises a rotary dampening means.

In particular, the ring-like member 157 is substantially cylindrical with an inner peripheral cylindrical surface 159 and a rear wall 160 cooperates with a closure or front wall member 161 to define a chamber 162 within the ring-like member 157.

The inner ring-like member 168 comprises a substantially cylindrical member having an outer peripheral cylindrical surface 163 adapted to face the internal peripheral surface 159 of the outer ring member 157 and is mounted on a central shaft 164 that has one end 165 journaled in a closed ended bore 166 in the cover member 161 and another end 167 that passes through an opening 168 in the rear wall 160 of the outer ring member 157.

The rear wall 160 of the outer ring member 157 is adapted to be secured to the rear wall 52B of the support member 44B of the tensioner 22B in any suitable manner, such as by welding or the like, with the shaft 164 of the dampening means 40B passing through an opening 169 in the rear wall 52B while being rotatable therein.

The end 167 of the shaft 164 carries a pinion gear 170 that has its gear teeth 170' adapted to be disposed in meshing engagement with teeth 171 of a rack-like member 172 secured to the transverse wall 48B of the belt engaging means 38B of the tensioner 22B. For example, the rack-like member 172 can have an externally reduced rod-like part 173 passing through the opening 113B in the wall 48B to be secured thereto by the nut 114B whereby the rack-like part 172 of the fluid dampening means 40B is mounted in parallel relation between the parallel springs 79B and thereby permits the up and down movement of the wall 48B to be translated into rotary movement of the shaft 164 and, thus, rotary movement of the inner ring-like member 158 relative to the outer ring-like member 157 for a purpose hereinafter described.

The inner ring-like member 158 has a plurality of circumferentially spaced and radially outwardly extending vanes 174 having free ends 175 disposed closely adjacent the internal peripheral surface 159 of the outer ring-like member 157 for a purpose hereinafter described.

Similarly, the outer ring-like member 157 has a plurality of circumferentially spaced and radially outwardly extending vanes 176 respectively provided with free ends 177 disposed closely adjacent the outer peripheral surface 163 of the inner ring-like member 158 for a purpose hereinafter described, the vanes 176 of the outer ring-like member 157 and the vanes 174 of the inner ring-like member 158 being disposed in the staggered relation illustrated in FIG. 11 to permit limited rotary movement of the inner ring-like member 158 in both a clockwise and counter clockwise direction until the vanes 174 abut against the vanes 176 as will be apparent because the vanes 176 are disposed in the rotary path of movement of the vanes 174.

By disposing a suitable dampening fluid in the chamber 162 of the rotary dampening means 40B, such as a hydraulic oil or the like, the rotary movement of the inner ring-like member 158 relative to the outer ring-like member 157 can be controlled by the degree of spacing provided between the outer free ends 175 and 177 of the vanes 174 and 176 and the cooperating peripheral surfaces 159 and 163 of the ring-like members 157 and 158 as will be apparent hereinafter.

Also, the amount of fluid dampening in the direction of rotation of the inner ring-like member 158 relative to the outer ring-like member 157 can be preferentially controlled by changing the angle of attack of one side 178 or 179 of the vanes 174 relative to the other side 179 or 178 thereof and/or the angle of attack of one side 180 or 181 of the vanes 176 relative to the other side 181 or 180 thereof. In addition or alternately thereto, the vanes 174 and/or vanes 176 can be provided with one-way check valves in passages passing through the opposed sides 178 and 179 thereof to permit unrestricted flow in one direction therethrough and restricted flow in the other direction therethrough as will be apparent hereinafter.

In any event, when the desired dampening fluid, such as a hydraulic oil or the like is disposed within the chamber 162, the dampener 40B will dampen up and down movement of the belt engaging means 38B of the tensioner 22B through rotary movement of the inner ring-like member 158.

Therefore, it can be seen that it is a relatively simple method of this invention to form the tensioner 22B in the manner previously described and to utilize the rotary dampener 40B of this invention therewith to operate in a manner now to be described.

Figure 11:
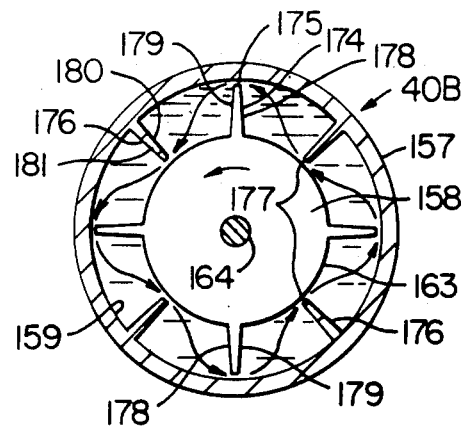
FIG. 11 is a cross-sectional view of the fluid dampening means of the belt tensioner of FIGS. 9 and 10 and is taken on lines 11—11 of FIG. 10.
Figure 12:
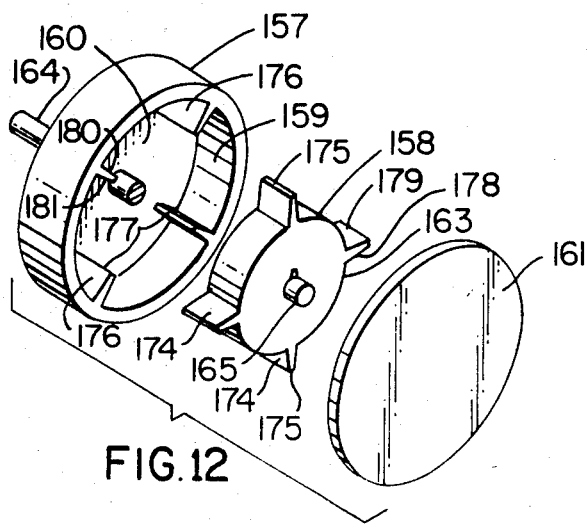
FIG. 12 is an exploded perspective view illustrating the parts of the fluid dampening means of the belt tensioner of FIGS. 9 and 10.

After the tensioner 22B has been mounted to the mounting bracket 37 of the engine 20 and the force of the springs 79B has been set in the manner previously described for the tensioner 22, subsequent downward movement of the belt engaging means 38B under the force of the compression springs 79B in a belt tensioning direction causes the rack-like member 172 to move downwardly therewith and thereby rotate the pinion gear 170 in a counterclockwise direction in FIG. 9 to cause counterclockwise rotation of the shaft 164 and, thus, counterclockwise rotation of the inner ring-like member 148 relative to the outer ring-like member 157 in FIG. 11 whereby the inner vanes 174 tend to drive the fluid against the sides 179 thereof toward the sides 180 of the outer vanes 176 and thereby cause the hydraulic fluid in the collapsing pockets between the vanes 174 and 176 to be forced between the free ends 177 of the vanes 176 and the inner peripheral surface 163 of the inner ring-like member 58 as well as through the spacing between the free ends 175 of the inner vanes 174 and the inner peripheral surface 159 of the outer ring-like member 157 in a manner to retard or restrict such downward movement of the belt engaging means 38B for the dampening reasons previously set forth.

Conversely, when the tensioned belt tends to move the belt engaging means 38B upwardly in FIGS. 9 and 10, such upward movement of the transverse wall 48B carries the rack-like member 172 therewith and causes the pinion gear 170 to rotate in a clockwise direction in FIG. 9 and thereby cause clockwise rotation of the inner ring-like member 158 relative to the outer ring-like member 157 so that the inner vanes 174 have the sides 178 thereof tending to compress the fluid toward the sides 181 of the outer vanes 176. Thus, the fluid in the collapsing pockets of the dampener 40B is forced through the space between the inner free ends 177 of the outer vanes 176 and the inner peripheral surface 163 of the inner ring-like member 158 as well as between the outer free ends 175 of the inner vanes 174 and the inner peripheral surface 159 of the outer ring member 157 to restrict such rotary movement and thereby dampen the upward movement of the belt engaging means 38B relative to the support means 36B.

As previously set forth, by making the rotary motion of the dampener 158 more restrictive in the clockwise rotation thereof in FIG. 11 than in the counterclockwise rotation thereof, a greater restrictive force will be imposed on the belt engaging means 38B in a direction thereof away from the belt than toward the belt for the reasons previously set forth.

While the rotary dampening means 40B of this invention has been illustrated and described as being particularly adapted to provide a fluid dampening means for the tensioner 22B it is to be understood that the rotary dampener 40B of this invention can be utilized for dampening other devices than belt tensioners as desired whereby the fluid dampening device 40B of this invention is not to be limited to only a belt tensioner arrangement.

Therefore, it can be seen that this invention not only provides improved belt tensioners and methods of making the same, but also this invention provides improved parts for such belt tensioners or the like and methods of making such improved parts.

While the forms and methods of this invention now preferred have been illustrated and described as required by the Patent Statute, it is to be understood that other forms and method steps can be utilized and still fall within the scope of the appended claims.

What is claimed is:

1. In a tensioner for a power transmission belt that is adapted to be operated in an endless path, said tensioner comprising a support means for being fixed relative to said belt, a belt engaging means carried by said support means and being movable relative thereto, mechanical spring means operatively associated with said support means and said belt engaging means for urging said belt engaging means relative to said support means and against said belt with a force to tension said belt, and fluid dampening means operatively associated with said support means and said belt engaging means to dampen the movement of said belt engaging means relative to said support means in at least one direction of movement thereof, said fluid dampening means comprising a piston and cylinder means having a piston member and a cylinder member, the improvement wherein said mechanical spring means comprises a pair of coiled compression springs with their longitudinal axes disposed in substantially parallel side-by-side spaced relation, said fluid dampening means being generally disposed between said springs and in substantially parallel relation therewith, said belt engaging means having a part thereof disposed in sliding relation with said support means, said part of said belt engaging means having a pair of substantially flat parallel spaced apart surfaces interconnected together by a front wall, said support means having a part thereof comprising a pair of substantially flat parallel spaced apart surfaces respectively facing said surfaces of said part of said belt engaging means and being interconnected together by a rear wall, and bearing means disposed between said facing surfaces to facilitate said sliding movement between said part of said belt engaging means and said support means, said part of said belt engaging means having a third substantially flat surface disposed between said pair of surfaces thereof and being substantially transverse relative thereto, said springs and said piston member of said fluid dampening means being respectively operatively interconnected to said third surface of said belt engaging means, said part of said support means having a third substantially flat surface disposed between said pair of surfaces thereof and being substantially transverse thereto and being between said pair of springs, said cylinder member of said fluid dampening means being operatively interconnected to said third surface of said support means.

2. A tensioner as set forth in claim 1 wherein said cylinder member has an externally threaded portion, said third surface of said support means having an internally threaded opening passing therethrough and threadedly receiving said threaded portion of said cylinder member therein to operatively interconnect said cylinder member to said support means.

3. A tensioner as set forth in claim 1 wherein said springs each has opposed ends, each said spring having one of said ends thereof bearing against said third surface of said belt engaging means and having the other of said ends thereof bearing against said support means.

4. A tensioner as set forth in claim 3 wherein said support means has a pair of adjustable parts against which said other ends of said springs respectively bear whereby the urging force of said springs is adjustable.

* * * * *